United States Patent [19]

Sasaki

[11] Patent Number: 5,073,882
[45] Date of Patent: Dec. 17, 1991

[54] SERVO-CONTROLLED ACTUATOR WITH TWO-PEAK FLUX DENSITY DISTRIBUTION

[75] Inventor: Yoshinori Sasaki, Tokyo, Japan

[73] Assignee: NEC Corporation, Tokyo, Japan

[21] Appl. No.: 412,717

[22] Filed: Sep. 26, 1989

[30] Foreign Application Priority Data

Sep. 26, 1988 [JP] Japan .................................. 63-241434
Oct. 21, 1988 [JP] Japan .................................. 63-266534
Nov. 11, 1988 [JP] Japan .................................. 63-285105

[51] Int. Cl.$^5$ .............................................. G11B 7/00
[52] U.S. Cl. ............................... 369/44.15; 369/44.14; 359/814; 359/824
[58] Field of Search ............... 369/44.14, 44.15, 44.22, 369/13; 360/114; 350/247, 255, 6.3

[56] References Cited

U.S. PATENT DOCUMENTS 4,987,565  1/1991  Ikegame .......................... 369/44.15

Primary Examiner—Roy N. Envall, Jr.
Assistant Examiner—Hung Dang
Attorney, Agent, or Firm—Sughrue, Mion, Zinn, Macpeak & Seas

[57] ABSTRACT

A lens actuator comprises a permanent magnet which generates a magnetic flux density distribution having two peaks of equal magnitudes, the two peaks being located symmetrically on opposite sides of a center axis of the distribution and arranged in a first direction perpendicular to the center axis. A pair of first coils and a second coil are mounted on a resiliently movable support. The first coils have first coil sections which cooperate with the magnetic flux to generate force components contributing to movement of the support in a second direction perpendicular to the first direction and second coil sections which cooperate with the magnetic flux to generate force components not contributing to the movement of the support in the second direction. The second coil sections of the first coils are located respectively at the peaks of the magnetic flux density distribution. The second coil cooperates with the magnetic flux to produce a force component that moves the support in the first direction. Because of the two peaks, flux densities do not substantially differ between upper and lower sections of the first coils when they are moved in a focusing direction.

15 Claims, 5 Drawing Sheets

Magnetic Flux Density

Magnetic Flux Density

SERVO-CONTROLLED ACTUATOR WITH TWO-PEAK FLUX DENSITY DISTRIBUTION

BACKGROUND OF THE INVENTION

The present invention relates generally to servo-controlled actuators, and more specifically to a lens actuator which is servo-controlled to keep the optical axis of a tracking following device on the right track of a recording disk such as optical disks.

Conventional track following devices include a permanent magnet mounted on a base, and at least one pair of tracking coils and a focusing coil which are mounted on a resiliently movable support. These coils cooperate with the magnet to produce force components in a direction transverse to the direction of tracks to keep the optical axis of a lens system on a desired track and in an orthogonal direction to focus a light beam on the track. Magnetic flux density distribution generated by the permanent magnet has only one peak. As the tracking coils are moved in a focusing direction, flux densities at the upper and lower portions of the tracking coils tend to differ from each other, causing a rotary moment to occur in the movable support. The optical axis of the lens is thus tilted with respect to the vertical.

SUMMARY OF THE INVENTION

It is therefore an object of the present invention to provide an actuator which eliminates the tilting of a major axis of a movable support by the provision of a magnetic flux density distribution having two peaks.

According to a broader aspect of the present invention, a magnetic flux density distribution having two peaks of equal magnitudes are generated, the two peaks being located symmetrically on opposite sides of a center axis of the distribution and arranged in a first direction perpendicular to the center axis. A pair of first coils and a second coil are mounted on a resiliently movable support. The first coils have first coil sections which cooperate with the magnetic flux to generate force components contributing to movement of the support in a second direction perpendicular to the first direction and second coil sections which cooperate with the magnetic flux to generate force components not contributing to the movement of the support in the second direction. The second coil sections of the first coils are located respectively at the peaks of the magnetic flux density distribution. The second coil cooperates with the magnetic flux to produce a force component that moves the support in the first direction. Because of the two peaks, flux densities do not substantially differ between upper and lower sections of the first coils when they are moved in a focusing direction. Specifically, the magnetic flux density distribution is generated by a permanent magnetic having opposite pole faces on major surfaces thereof and a groove formed on one of the pole faces, the groove extending in the second direction.

According to a second aspect, the actuator of the present invention is provided for optical disk and comprises a magnetic flux generator mounted on a base to generate a magnetic flux density distribution having two peaks of equal magnitudes, the two peaks being located symmetrically on opposite sides of a center axis of the distribution and arranged in a first direction perpendicular to the center axis. A pair of tracking coils and a focusing coil are mounted on a support resiliently movable with respect to the base. The tracking coils have first coil sections which cooperate with the magnetic flux to generate force components contributing to movement of the support in a second direction perpendicular to the first direction and second coil sections which cooperate with the magnetic flux to generate force components not contributing to the movement of the support in the second direction. The second coil sections of the tracking coils are located respectively at the peaks of the magnetic flux density distribution. The focusing coil cooperates with the magnetic flux to produce a force component that moves the support in the first direction. An optical lens is mounted on the movable support so that an optical axis thereof extends in the first direction to form a light spot on the recording disk.

BRIEF DESCRIPTION OF THE DRAWINGS

The present invention will be described in further detail with reference to the accompanying drawings, in which.

DETAILED DESCRIPTION

Figure 1:
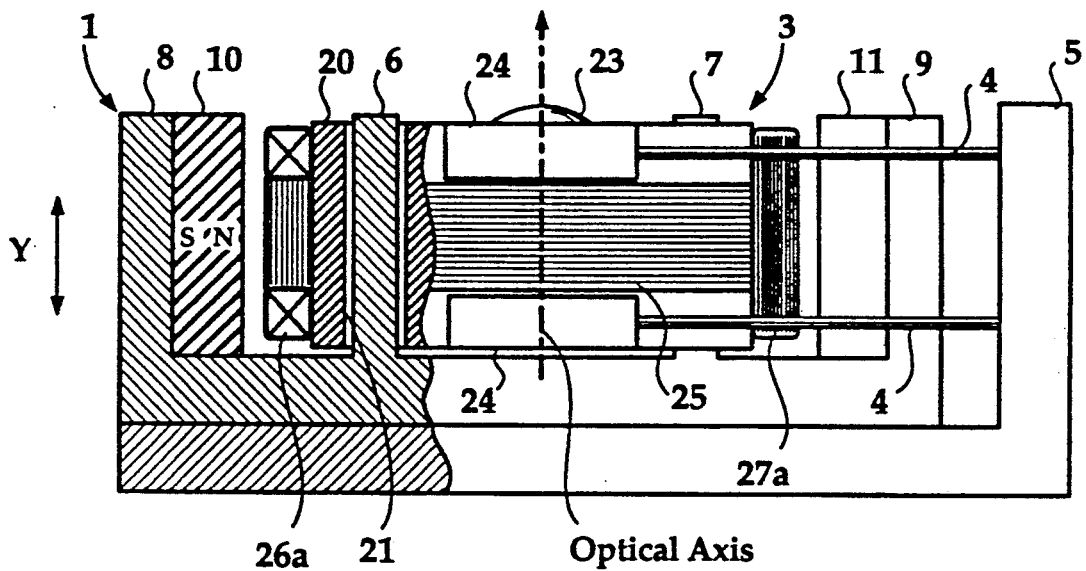
FIG. 1 is a side view in elevation of a prior art lens actuator.
Figure 2:
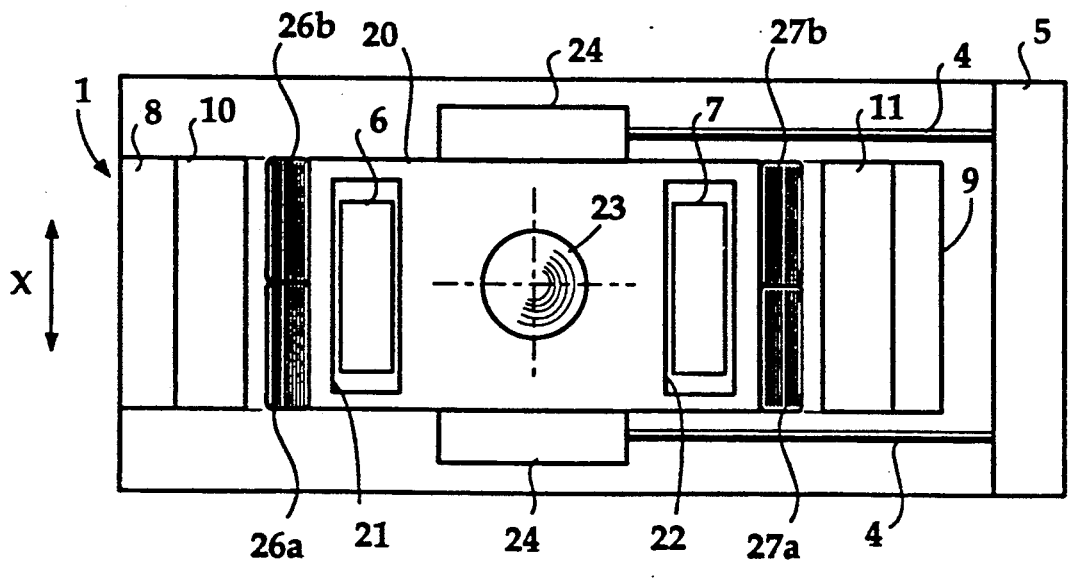
FIG. 2 is a plan view of the prior art lens actuator.

Prior to the description of the present invention, it is appropriate to describe a prior art servo-controlled lens actuator for use with optical disks with reference to FIGS. 1 to 4. In FIGS. 1 and 2, a prior art lens actuator generally comprises a stationary element 1 mounted on a base 2 and a moving element 3 resiliently supported by means of four parallel wire springs 4 that extend horizontally from an upright wall portion 5 of the base 2. Base 2 is in turn mounted on a tracking seeking device, not shown, to follow tracks on an optical disk such as Compact Disc. Stationary element 1 of magnetic material is provided with yokes 6 and 7 and upright wall portions 8 and 9. Rectangular flat permanent magnets 10 and 11 are fitted to the upright wall portions 8 and 9. These permanent magnets are magnetized in the direction of thickness so that north and south pole faces are parallel to the wall portions 8 and 9 and respectively cooperates with the yokes 6 and 7 to produce desired magnetic flux density distributions vertically across the tracking coils 26 and 27.

Moving element 3 comprises a support 20 of nonmagnetic material formed with a pair of vertically extending through holes 21 and 22 through which the yokes 6 and 7 of the stationary element respectively extend with sufficient lateral margins. A focusing lens 23 is mounted on the upper surface of support 20 for focusing a spot of a laser beam onto an optical disk. Blocks 24 hold the wire springs 4 to resiliently keep the support 20 in a movable position so that lens 23 is able to move in vertical directions (in the directions of Y axis) as well as in horizontal directions (in the directions of X axis) that traverse a track 30 of the optical disk. A focusing coil 25 is wound on the support 20 to interact with the permanent magnets 10 and 11 to control the position of lens 23 with respect to the X axis. A first pair of tracking coils 26a and 26b are secured side-by-side to one end of support 20 and a second pair of tracking coils 27a and 27b are secured side-by-side to the opposite end of support 20.

Figure 3A:
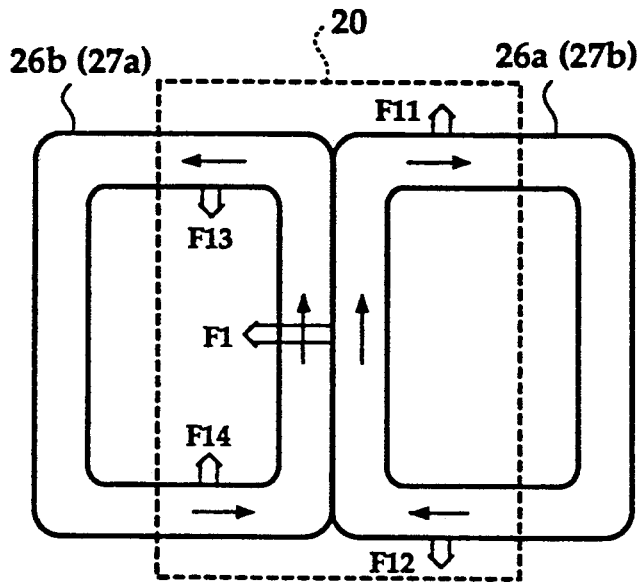
FIGS. 3A and 3B are illustrations for describing the operation of the tracking coils of the prior art lens actuator when the focusing coil is not energized.
Figure 3B:
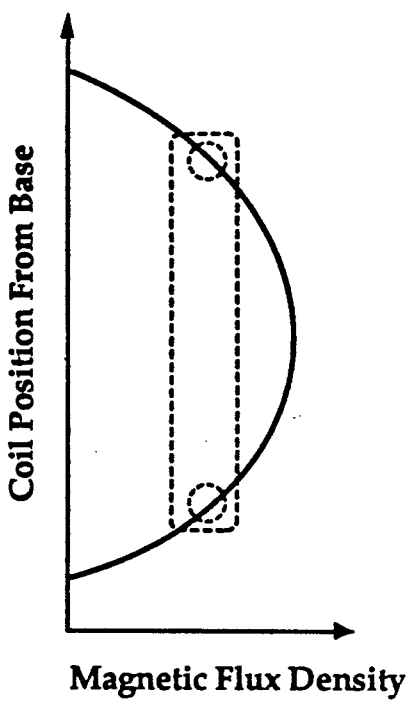
Figure 4A:
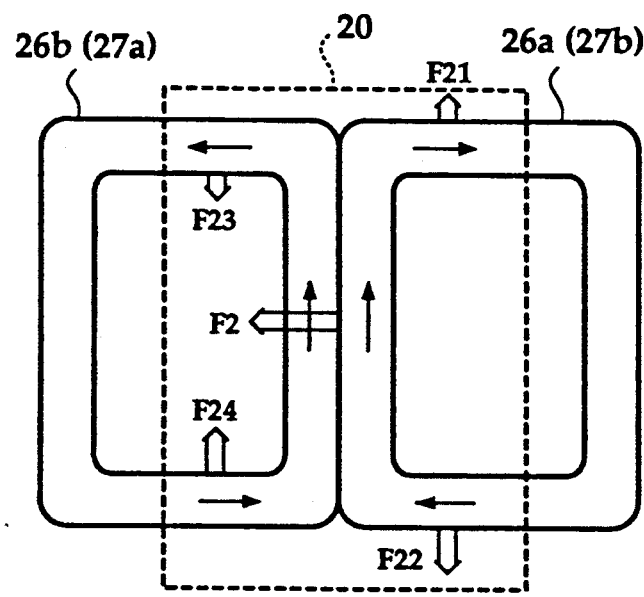
FIGS. 4A and 4B are illustrations for describing the operation of the tracking coils of the prior art lens actuator when the focusing coil is energized.
Figure 4B:
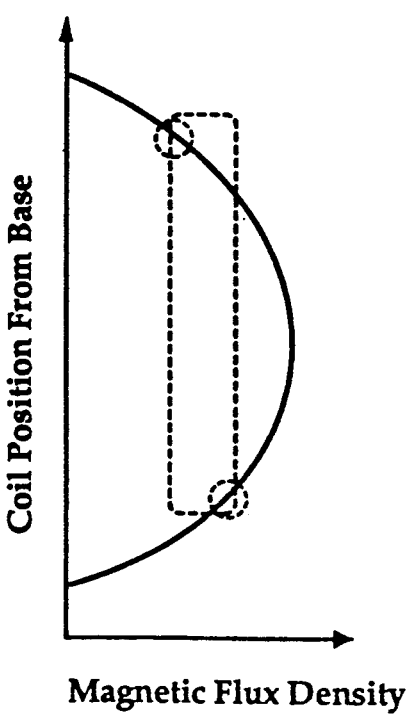

As shown in FIG. 3B, the magnetic flux density distribution of each of the permanent magnets 10 and 11 has a single peak. When tracking coils 26a (27b) and 26b (27a) are held in a normal vertical position (when focusing coil 25 is not energized), the magnetic flux densities in the upper and lower arms of the coils are of equal magnitudes. If currents are generated in these coils as indicated by the arrows in FIG. 3A, force components F11 and F12 of equal magnitudes and opposite directions are respectively induced in the upper and lower arms of the coil 26a (27b) and force components F13 and F14 of equal magnitudes and opposite directions are respectively induced in the upper and lower arms of coil 26b (27a). The force components on the upper arms are balanced against those in the lower arms, and combined force components F1 induced in the central limbs of the coils are the only factor that contributes to tracking control in the directions of the X axis. If a current is supplied to the focusing coil 25, causing the coils to move slightly upwards as indicated in FIGS. 4A and 4B, the magnetic flux densities in the upper and lower arms of the coils differ from each other as indicated by dotted circles in FIG. 4B, resulting in force components F21 and F23 which are smaller than counteracting force components F22 and F24, respectively. Therefore, a clockwise rotary moment is generated at the bottom portion of the coils, causing the lens 23 to tilt with respect to the vertical.

The present invention eliminates this problem by the provision of permanent magnets which produce magnetic flux density distributions having two peaks of equal magnitudes.

Figure 5:
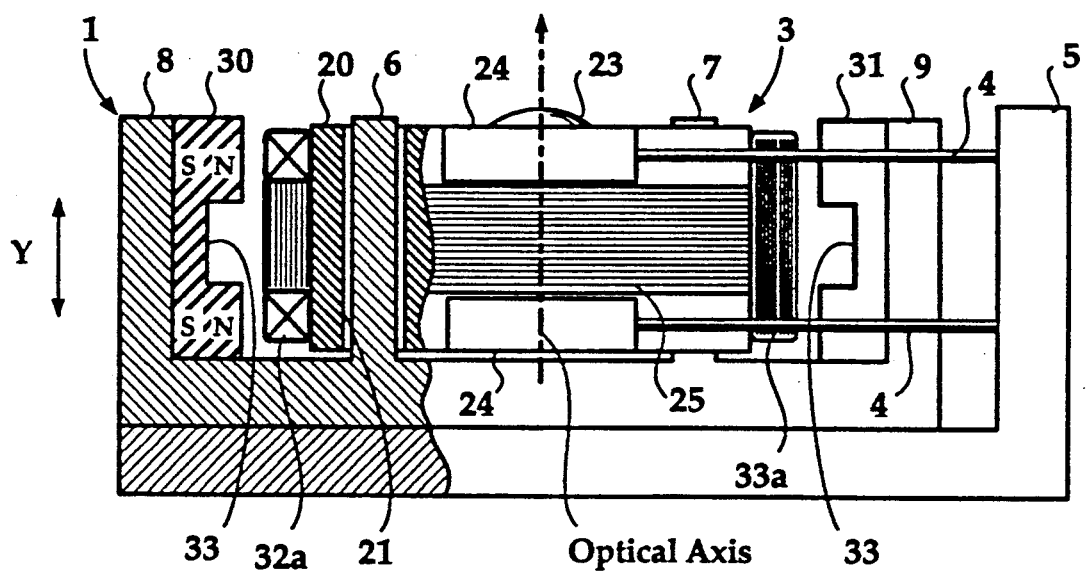
FIG. 5 is a plan view of a lens actuator according to one embodiment of the present invention.
Figure 6:
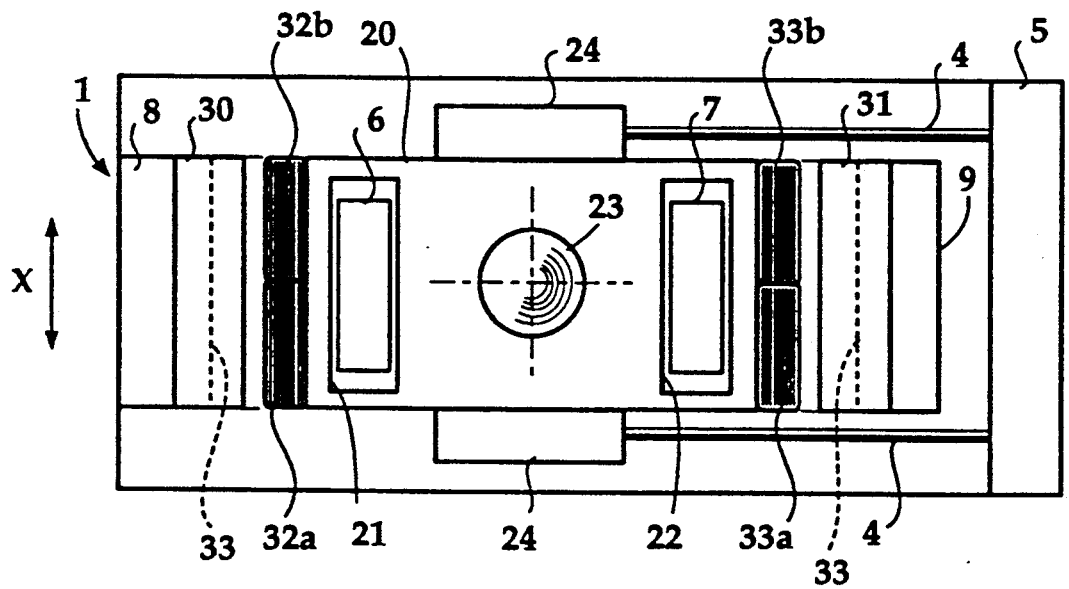
FIG. 6 is a plan view of the lens actuator of FIG. 5.

In FIGS. 5 and 6, the lens actuator of the present invention is illustrated in which parts corresponding to those in FIGS. 1 and 2 are marked with the same numerals as used in FIGS. 1 and 2. For purposes of identification, coils are designated 32a, 32b, 33a and 33b, respectively. As it is seen from FIG. 5, permanent magnets 30 and 31 are disposed in place of the permanent magnets 10 and 11 of the prior art lens actuator. Each of the permanent magnets 30 and 31 is magnetized in the direction of thickness so that north and south pole faces are parallel to the associated coils and is formed with a horizontally extending groove 33 on the side facing the associated coils so that the north pole face is divided into upper and lower parts.

Figure 7A:
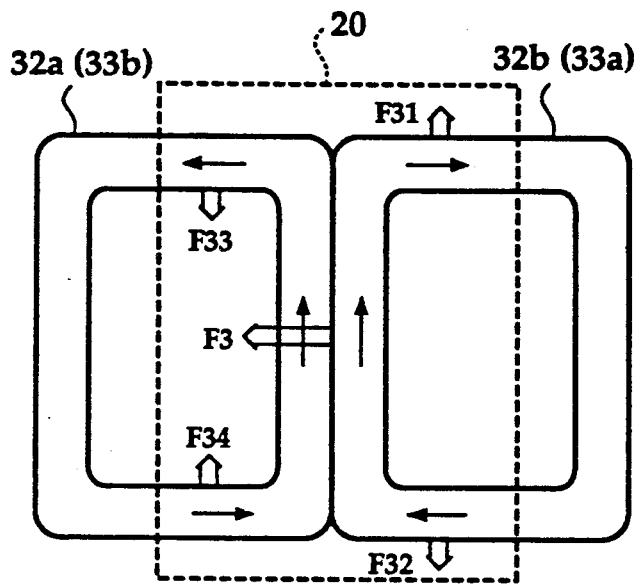
FIGS. 7A and 7B are illustrations for describing the operation of the tracking coils of the lens actuator of the present invention when the focusing coil is not energized.
Figure 7B:
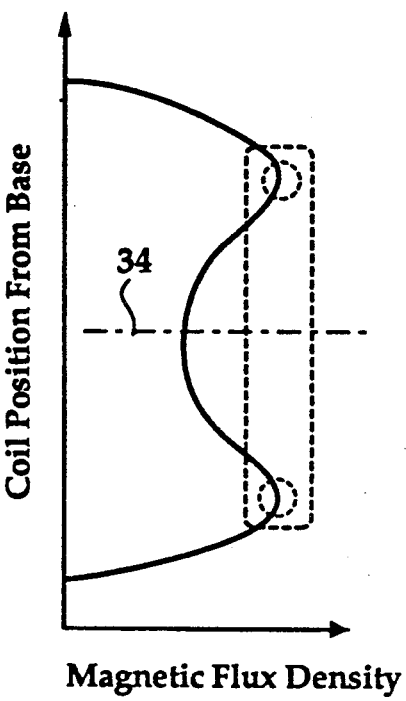
Figure 8A:
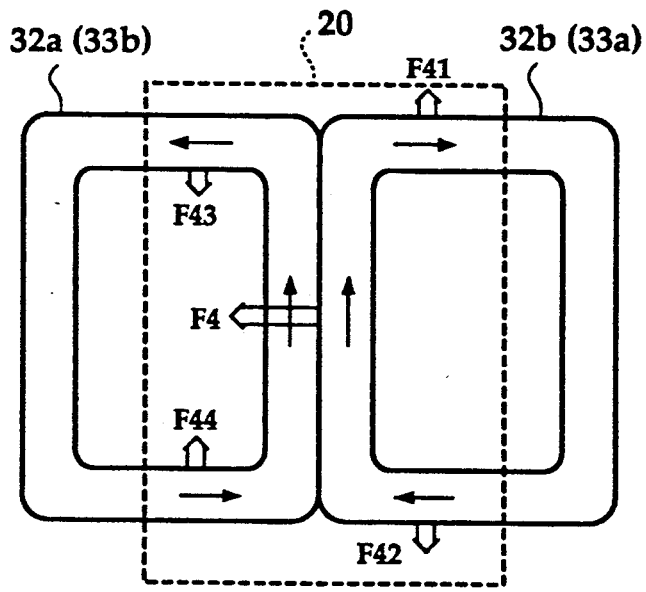
FIGS. 8A and 8B are illustrations for describing the operation of the tracking coils of the lens actuator of the present invention when the focusing coil is energized.
Figure 8B:
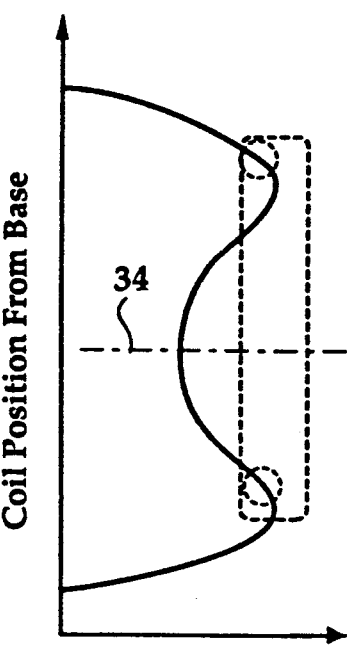

As shown in FIG. 7B, the magnetic flux density distribution of each of the permanent magnets 30 and 31 has upper and lower peaks of equal magnitudes symmetrically positioned with respect to a center axis 34 of the distribution. When the focusing coil 25 is not energized, tracking coils 32a (33b) and 32b (33a) are held in a normal vertical position and the upper and lower arms of these coils, which do not contribute to tracking control, are located at the peak portions of the flux density distribution so that the magnetic flux densities in these portions of the tracking coils are of equal magnitudes. If currents are generated in these tracking coils as indicated by the arrows in FIG. 7A, force components F31 and F32 of equal magnitudes of opposite directions are induced in the upper and lower arms of the coil 32a (33b) and force components F33 and F34 of equal magnitudes of opposite directions are induced in the upper and lower arms of coil 32b (33a). Combined force components F3 induced in the central limbs of the coils contribute to tracking control in the directions of the X axis. If a current is supplied to the focusing coil 25, causing the tracking coils to move slightly upwards as indicated in FIG. 8A, the upper and lower arms of the tracking coils are respectively positioned at slope portions of equal magnetic flux densities as indicated by dotted circles in FIG. 8B, resulting in force components F41 and F43 which are equal in magnitude to counteracting force components F42 and F44, respectively. Therefore, no rotary moment is generated in the tracking coils.

Figure 9A:
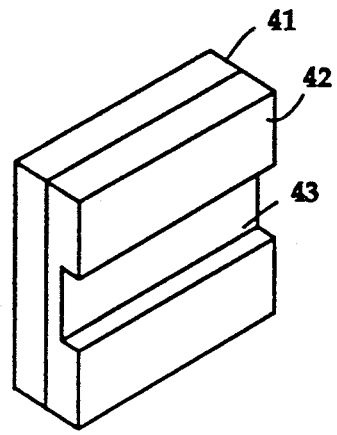
FIGS. 9A to 9D and 9F are illustrations of modified permanent magnets.

As shown in FIGS. 9A to 9F, various modifications of the permanent magnets 30 and 31 are possible. In FIG. 9A, the symmetrical flux density distribution with two equal peaks is formed by a permanent magnet 41 having flat pole faces on major surfaces. A magnetic block 42 of high permeability is formed with a horizontally extending groove 43 and is cemented to the magnet 41 so that the grooved side of the block 42 is positioned facing toward the associated tracking coils.

Figure 9B:
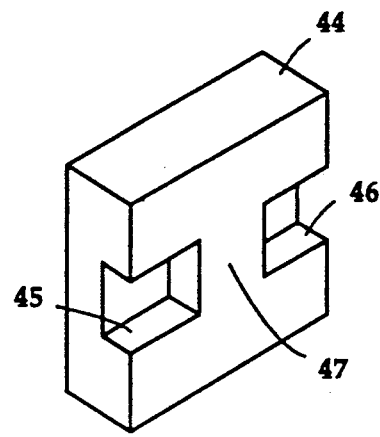
Figure 9C:
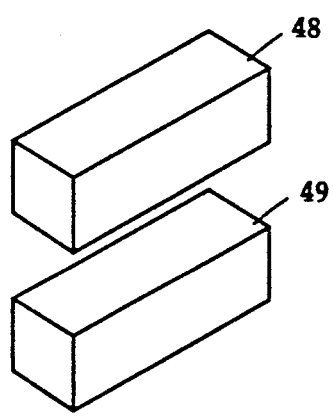
Figure 9D:
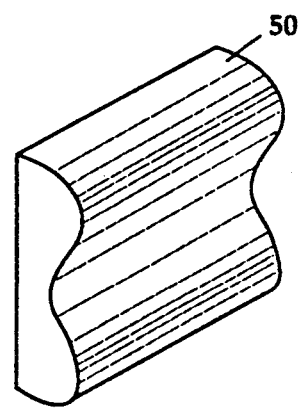
Figure 9F:
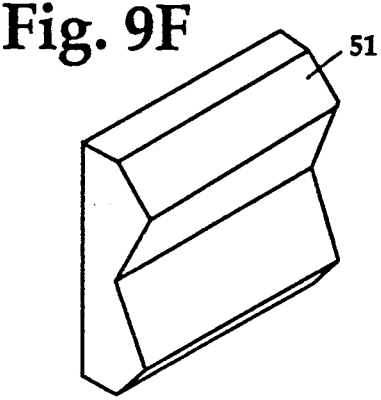

In FIG. 9B, a permanent magnet 44 having flat pole faces is formed with cutouts 45 and 46 on one pole face, the cutouts being horizontally aligned with each other, leaving a center portion 47 therebetween to face toward the center limbs of the associated tracking coils. The center portion 47 produces a high flux density which is advantageous for producing a large torque for tracking movements. A pair of rectangular-sectioned bar magnets 48 and 49 (FIG. 9C) can be used. This simplifies manufacturing processes. A permanent magnet 50, shown in FIG. 9D, has a pole face which is curved to produce the desired flux density configuration. A permanent magnet 52 shown in FIG. 9F has a pole face segmented into flat portions to approximate the curved pole face of FIG. 9D. This simplifies the machining process.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:
1. An actuator comprising:
   magnetic flux generating means mounted on a base, said magnetic flux generating means producing a magnetic flux density distribution having two peaks of equal magnitudes, said two peaks being located symmetrically on opposite sides of a center axis of said distribution and arranged in a first direction perpendicular to said center axis; and
   a pair of first coils and a second coil mounted on a support resiliently movable with respect to the base, said first coils having first coil sections which cooperate with said magnetic flux generating means to generate force components contributing to movement of said support in a second direction perpendicular to said first direction and second coil sections which cooperate with said magnetic flux generating means to generate force components not contributing to the movement of said support in said second direction, the second coil sections of said first coils being located respectively at said peaks of the magnetic flux density distribution, said second coil cooperating with said magnetic flux generating means to produce a force component that moves said support in said first direction.

2. An actuator as claimed in claim 1, wherein said magnetic flux generating means comprises a permanent magnetic having opposite pole faces on major surfaces thereof and a groove formed on one of said pole faces, said groove extending in said second direction, and a magnetic circuit including a yoke spaced from said permanent magnet, said first coils being located between said permanent magnet and said yoke.

3. An actuator as claimed in claim 1, wherein said magnetic flux generating means comprises a permanent magnetic having opposite pole faces on major surfaces thereof and a magnetic body of high permeability secured to one of the major surfaces of the permanent magnet, said magnetic body being formed with a groove extending in said second direction, and a magnetic circuit including a yoke spaced from said permanent magnet, said first coils being located between said permanent magnet and said yoke.

4. An actuator as claimed in claim 1, wherein said magnetic flux generating means comprises a permanent magnet having opposite pole faces on major surfaces thereof, said magnet being formed with a pair of cutouts arranged in said second direction, leaving a center portion therebetween, said center portion corresponding in position to said first coil sections of said first coils, and a magnetic circuit including a yoke spaced from said permanent magnet, said first coils being located between said permanent magnet and said yoke.

5. An actuator as claimed in claim 1, wherein said magnetic flux generating means comprises a pair of bar magnets each having opposite pole faces on major surfaces thereof, said bar magnets being spaced apart from each other in said first direction, and a magnetic circuit including a yoke spaced from said bar magnets, said first coils being located between said bar magnets and said yoke.

6. An actuator as claimed in claim 1, wherein said magnetic flux generating means comprises a permanent magnet having opposite pole faces on major surfaces thereof, one of said pole faces being curved to generally conform to said magnetic flux density distribution, and a magnetic circuit including a yoke spaced from said permanent magnet, said first coils being located between said permanent magnet and said yoke.

7. An actuator as claimed in claim 1, wherein said magnetic flux generating means comprises a permanent magnet having opposite pole faces on major surfaces thereof, one of said pole faces being divided into flat face segments to approximate a curve, and a magnetic circuit including a yoke spaced from said permanent magnet, said first coils being located between said permanent magnet and said yoke.

8. A track following device for use with a recording disk, comprising:

magnetic flux generating means mounted on a base, said magnetic flux generating means producing a magnetic flux density distribution having two peaks of equal magnitudes, said two peaks being located symmetrically on opposite sides of a center axis of said distribution and arranged in a first direction perpendicular to said center axis;

a pair of tracking coils and a focusing coil mounted on a support resiliently movable with respect to the base, said tracking coils having first coil sections which cooperate with said magnetic flux generating means to generate force components contributing to movement of said support in a second direction perpendicular to said first direction and second coil sections which cooperate with said magnetic flux generating means to generate force components not contributing to the movement of said support in said second direction, the second coil sections of said tracking coils being located respectively at said peaks of the magnetic flux density distribution, said focusing coil cooperating with said magnetic flux generating means to produce a force component that moves said support in said first direction; and an optical lens mounted on said support, said optical lens having an optical axis extending in said first direction to form a light spot on said recording disk.

9. A track following device as claimed in claim 8, wherein said magnetic flux generating means comprises a permanent magnetic having opposite pole faces on major surfaces thereof and a groove formed on one of said pole faces, said groove extending in said second direction, and a magnetic circuit including a yoke spaced from said permanent magnet, said first coils being located between said permanent magnet and said yoke.

10. A track following device as claimed in claim 8, wherein said magnetic flux generating means comprises a permanent magnet having opposite pole faces on major surfaces thereof and a magnetic body of high permeability secured to one of the major surfaces of the permanent magnet, said magnetic body being formed with a groove extending in said second direction, and a magnetic circuit including a yoke spaced from said permanent magnet, said first coils being located between said permanent magnet and said yoke.

11. A track following device as claimed in claim 8, wherein said magnetic flux generating means comprises a permanent magnet having opposite pole faces on major surfaces thereof, said magnet being formed with a pair of cutouts arranged in said second direction, leaving a center portion therebetween, said center portion corresponding in position to said first coil sections of said first coils, and a magnetic circuit including a yoke spaced from said permanent magnet, said first coils being located between said permanent magnet and said yoke.

12. A track following device as claimed in claim 8, wherein said magnetic flux generating means comprises a pair of bar magnets each having opposite pole faces on major surfaces thereof, said bar magnets being spaced apart from each other in said first direction, and a magnetic circuit including a yoke spaced from said bar magnets, said first coils being located between said bar magnets and said yoke.

13. A track following device as claimed in claim 8, wherein said magnetic flux generating means comprises a permanent magnet having opposite pole faces on major surfaces thereof, one of said pole faces being curved to generally conform to said magnetic flux density distribution, and a magnetic circuit including a yoke spaced from said permanent magnet, said first coils being located between said permanent magnet and said yoke.

14. A track following device as claimed in claim 8, wherein said magnetic flux generating means comprises a permanent magnet having opposite pole faces on major surfaces thereof, one of said pole faces being divided into flat face segments to approximate a curve, and a magnetic circuit including a yoke spaced from said permanent magnet, said first coils being located between said permanent magnet and said yoke.

15. A track following device as claimed in claim 8, further comprising second magnetic flux generating means identical to the first-mentioned magnetic flux generating means and a second pair of tracking coils identical to the first-mentioned tracking coils, the second magnetic flux generating means being mounted on said base and the second tracking coils being mounted on said support to cooperate with the second magnetic flux generating means.

* * * * *